US009013880B2

(12) United States Patent
Lai (10) Patent No.: US 9,013,880 B2
(45) Date of Patent: *Apr. 21, 2015

(54) FRAME MODULE AND COMPUTER HAVING THE SAME

(75) Inventor: Chun-Chang Lai, New Taipei (TW)

(73) Assignee: Aopen Inc., New Taipei (TW)

( * ) Notice: Subject to any disclaimer, the term of this patent is extended or adjusted under 35 U.S.C. 154(b) by 250 days.

This patent is subject to a terminal disclaimer.

(21) Appl. No.: 13/459,287

(22) Filed: Apr. 30, 2012

(65) Prior Publication Data

US 2012/0281349 A1 Nov. 8, 2012

(30) Foreign Application Priority Data

May 4, 2011 (TW) .............................. 100115594 A (51) Int. Cl.
| | | |
|---|---|---|
| H05K 5/00 | (2006.01) | |
| H05K 7/16 | (2006.01) | |
| H05K 7/00 | (2006.01) | |
| H05K 1/00 | (2006.01) | |
| H05K 7/14 | (2006.01) | |
| H05K 7/20 | (2006.01) | |
| H01R 25/00 | (2006.01) | |
| H01H 3/12 | (2006.01) | |
| H01H 13/14 | (2006.01) | |
| A47B 81/00 | (2006.01) | |

(Continued)

(52) U.S. Cl.
CPC ...... *G06F 1/183* (2013.01); *G06F 1/18* (2013.01); *G06F 1/187* (2013.01); *G06F 1/20* (2013.01); *G06F 1/181* (2013.01); *G11B 33/0405* (2013.01); *H01R 12/71* (2013.01)

(58) Field of Classification Search
CPC ..... G06F 1/1656; G06F 1/1658; G06F 1/185; G06F 1/181; G06F 1/187; G06F 1/183; G06F 1/18; G06F 1/20; H05K 5/00; H05K 9/0062; G11B 33/0405; H01R 12/71
USPC ............. 361/679.01–679.45, 679.55–679.59, 361/724–727, 728, 732, 796, 800, 748, 736, 361/759, 752, 704; 439/65, 638; 200/344, 200/520, 341, 293–296; 365/52, 63; 312/223.1, 223.2
See application file for complete search history.

(56) References Cited

U.S. PATENT DOCUMENTS 5,338,214 A * 8/1994 Steffes et al. ................. 439/160
6,147,862 A * 11/2000 Ho ............................ 361/679.32

(Continued)

FOREIGN PATENT DOCUMENTS

| TW | M282462 U | 12/2005 |
| TW | M282462 U * | 12/2005 |

(Continued)

OTHER PUBLICATIONS

Office Action issued to Taiwanese Counterpart Application No. 100115594 on Jan. 27, 2014. English summary provided by Saint Island Intellectual Property Co., Ltd.

*Primary Examiner* — Nidhi Thaker (74) *Attorney, Agent, or Firm* — Harness, Dickey & Pierce, PLC (57) ABSTRACT

A frame module is adapted to be disposed in a housing of a computer for fixing first and second electronic devices. The computer includes a motherboard unit with a socket connector. The frame module includes a frame body having top and bottom surfaces adapted to be connected respectively to the first and electronic devices. An adaptor board includes a board body connected transversely to a rear edge of the frame body and having an edge connector adapted to be inserted into the socket connector, and first and second electrical connectors for electrical connection with the first and second electronic devices, respectively.

11 Claims, 11 Drawing Sheets

(51) Int. Cl.
*G06F 1/18* (2006.01)
*G06F 1/20* (2006.01)
*G11B 33/04* (2006.01)
*H01R 12/71* (2011.01)

(56) References Cited

U.S. PATENT DOCUMENTS

| | | | |
|---|---|---|---|
| 7,453,692 B2* | 11/2008 | Chen | 361/679.33 |
| 2004/0125553 A1* | 7/2004 | Castell et al. | 361/683 |
| 2008/0087407 A1 | 4/2008 | Yang | |
| 2009/0016014 A1* | 1/2009 | Tu | 361/685 |
| 2010/0002367 A1* | 1/2010 | Chang | 361/679.02 |
| 2010/0073875 A1* | 3/2010 | Suzuki et al. | 361/695 |

FOREIGN PATENT DOCUMENTS

| | | |
|---|---|---|
| TW | M309699 U | 4/2007 |
| TW | M309846 U | 4/2007 |
| TW | M344500 U | 11/2008 |
| TW | 200904304 A | 1/2009 |
| TW | 200904305 A | 1/2009 |

* cited by examiner

FRAME MODULE AND COMPUTER HAVING THE SAME

CROSS REFERENCE TO RELATED APPLICATION

This application claims priority of Taiwanese Patent Application No. 100115594, filed on May 4, 2011, the disclosure of which is incorporated herein by reference.

BACKGROUND OF THE INVENTION

1. Field of the Invention

The invention relates to a computer, and more particularly to a mini computer having a frame module.

2. Description of the Related Art

With the rapid progress of technology, the efficiency of each hardware device in a computer increases, and even a very small single device can achieve a very high efficiency. Hence, various kinds of mini computers are successively released in the market in recent years.

A housing of a mini computer has a relatively limited space in an interior thereof. In response to a customization requirement, the hardware devices installed in the housing are different. If the housing is to be installed with complete and diverse hardware devices, such as a motherboard, a hard disk drive, an optical disk drive, a USB connector, a card reader, a Bluetooth transmitter, an antenna, etc., the space planning inside the housing of the computer becomes a major issue.

SUMMARY OF THE INVENTION

Therefore, an object of the present invention is to provide a frame module that can assist installation of complete hardware devices inside a mini computer.

According to one aspect of this invention, a frame module is adapted to be disposed in a housing of a computer for fixing a first electronic device and a second electronic device. The computer includes a motherboard unit with a socket connector. The frame module comprises a frame body and an adaptor board. The frame body includes a top surface adapted to be connected to the first electronic device, and a bottom surface adapted to be connected to the second electronic device. The adaptor board includes a board body connected transversely to a rear edge of the frame body and having an edge connector extending downwardly therefrom and adapted to be inserted into the socket connector of the motherboard unit, and a first electrical connector and a second electrical connector provided on a front side of the board body and spaced apart from each other in a top-bottom direction. The first electrical connector is disposed in proximity to the top surface of the frame body for electrical connection with the first electronic device. The second electrical connector is disposed in proximity to the bottom surface of the frame body for electrical connection with the second electronic device.

Preferably, the socket connector of the motherboard unit is formed with an insert groove. The edge connector of the adaptor board includes a plurality of spaced-apart first contacts arranged on a front surface of the board body, and a plurality of spaced-apart second contacts arranged on a rear surface of the board body. The first and second contacts are adapted to be connected electrically to the socket connector when the edge connector is inserted into the insert groove.

Preferably, the frame body further includes a front edge, spaced-apart first and second mounting lugs extending downwardly and transversely from the front edge, and a first mounting hole and a second mounting hole respectively formed in the first and second mounting lugs. The first and second mounting holes are disposed at different levels. The frame module further comprises a sensor board, two step screws, and two springs. The sensor board is disposed in front of the first and second mounting lugs, and is formed with two orifices that are registered respectively with the first and second mounting holes and that have an orifice diameter larger than a hole diameter of the first and second mounting holes. Each of the step screws has a first section and a second section coaxially connected to each other. The first section has a cross section diameter larger than that of the second section. The first sections of the step screws respectively extend through the orifices of the sensor board. The second sections of the step screws extend respectively into and are fixed threadedly and respectively in the first and second mounting holes. The springs are sleeved respectively on the first sections of the step screws. Each of the springs has a free length longer than that of the first section, a front end abutting against a rear side of the sensor board, and a rear end abutting against a front side of a corresponding one of the first and second mounting lugs to provide the sensor board with a biasing force.

Preferably, the ratio between the orifice diameter of the orifices and the cross section diameter of the first section ranges from 1.05 to 1.11.

Preferably, the first electronic device is an optical disk drive, and the housing includes a disk ejector operator provided on a front side thereof. The frame module further comprises an ejector control key disposed on the front edge of the frame body for coupling electrically the optical disk drive and for abutment against a rear side of the disk ejector operator.

Preferably, the frame body further includes a mounting flange extending downwardly and transversely from the front edge of the frame body and spaced apart from the first and second mounting lugs, and a third mounting hole formed in the mounting flange. The ejector control key is formed as a plate that is fastened to the third mounting hole and that abuts against the mounting flange.

According to another aspect of this invention, a computer comprises a housing, a motherboard unit disposed in the housing and including a socket connector, a first electronic device and a second electronic device, and a frame module. The frame module includes a frame body and an adaptor board. The frame body includes a top surface connected to the first electronic device and a bottom surface connected to the second electronic device. The adaptor board includes a board body connected transversely to a rear edge of the frame body and having an edge connector extending downwardly therefrom and inserted into the socket connector, and a first electrical connector and a second electrical connector provided on a front side of the board body and spaced apart from each other in a top-bottom direction. The first electrical connector is disposed in proximity to the top surface of the frame body and connected electrically to the first electronic device. The second electrical connector is disposed in proximity to the bottom surface of the frame body and connected electrically to the second electronic device.

Preferably, the housing includes a front plate having a press button. The frame module further includes spaced-apart first and second mounting lugs extending downwardly and transversely from a front edge of the frame body, and a sensor board disposed in front of the first and second mounting lugs and corresponding in position to the press button.

Preferably, the housing further includes a buffer pad sandwiched between the press button and the sensor board.

Preferably, the housing includes a rear plate formed with a vent hole. The computer further comprises a base to mount the motherboard unit thereon, and a heat dissipation module including a substrate, a heat pipe mounted on the substrate, a fan connected to a rear end of the substrate, and a buffer strip mounted on a top surface of the fan in proximity to a rear edge of the fan. The motherboard unit has a heat-generating element. The substrate is in contact with the heat-generating element and is fixed to the base. The fan is formed with an air inlet, and an air outlet corresponding to the vent hole.

Preferably, the housing includes a cover body having a top plate covering a top side of the cover body, and is formed with at least one antenna hole. The computer further comprises an antenna corresponding in number to the antenna hole and disposed on the cover body corresponding in position to the antenna hole.

According to yet another aspect of this invention, a frame module is adapted to be disposed in a housing of a computer for fixing a first electronic device and a second electronic device. The frame module comprises a frame body, a sensor board, two step screws, and two springs. The frame body includes a front edge, spaced-apart first and second mounting lugs extending downwardly and transversely from the front edge, and a first mounting hole and a second mounting hole respectively formed in the first and second mounting lugs. The first mounting hole and the second mounting hole are disposed at different levels. The sensor board is disposed in front of the first and second mounting lugs, and is formed with two orifices that are registered respectively with the first and second mounting holes and that have an orifice diameter larger than a hole diameter of the first and second mounting holes. Each of the step screws has a first section and a second section coaxially connected to each other. The first section has a cross section diameter larger than that of the second section. The first sections of the step screws respectively extend through the orifices of the sensor board. The second sections of the step screws extend respectively into and are fixed threadedly and respectively in the first and second mounting holes. The springs are sleeved respectively on the first sections of the step screws. Each of the springs has a free length longer than that of the first section, a front end abutting against a rear side of the sensor board, and a rear end abutting against a front side of a corresponding one of the first and second mounting lugs to provide the sensor board with a biasing force.

According to still yet another aspect of this invention, a computer comprises a housing including a front plate having a press button, and a frame module including a frame body, a sensor board, two step screws, and two springs. The frame body includes a front edge, spaced-apart first and second mounting lugs extending downwardly and transversely from the front edge, and a first mounting hole and a second mounting hole respectively formed in the first and second mounting lugs. The first mounting hole and the second mounting hole are disposed at different levels. The sensor board is disposed in front of the first and second mounting lugs and corresponds in position to the press button. The sensor board is formed with two orifices that are registered respectively with the first and second mounting holes and that have an orifice diameter larger than a hole diameter of the first and second mounting holes. Each of the step screws has a first section and a second section coaxially connected to each other. The first section has a cross section diameter larger than that of the second section. The first sections of the step screws respectively extend through the orifices of the sensor board. The second sections of the step screws extend respectively into and are fixed threadedly and respectively in the first and second mounting holes. The springs are sleeved respectively on the first sections of the step screws. Each of the springs has a free length longer than that of the first section, a front end abutting against a rear side of the sensor board, and a rear end abutting against a front side of a corresponding one of the first and second mounting lugs to provide the sensor board with a biasing force.

The efficiency of this invention resides in that by using the frame module for carrying out excellent interior space planning in a housing of a mini computer, all aspects of the hardware devices can be installed therein in response to a customization requirement. Further, the frame module is provided with a particular structural design to ensure an excellent touch effect and good yield.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of an embodiment in coordination with the reference drawings.

Referring to FIGS. 1 to 13, a computer 100 according to the embodiment of the present invention is shown to comprise a housing including a base 1 and a cover unit 2 covering the base 1 and cooperating with the same to define an accommodation space, and a motherboard unit 3, a heat dissipation module 4, a frame module 5, and a plurality of electronic devices all disposed in the accommodation space. In this embodiment, the accommodation space has a capacity of 1.5 liters, and the electronic devices include an optical disk drive 61, a hard disk drive 62, a card reader 63, a Bluethooth transmitter 64, and a USB connector 65. However, it is not limited as such.

Figure 1:
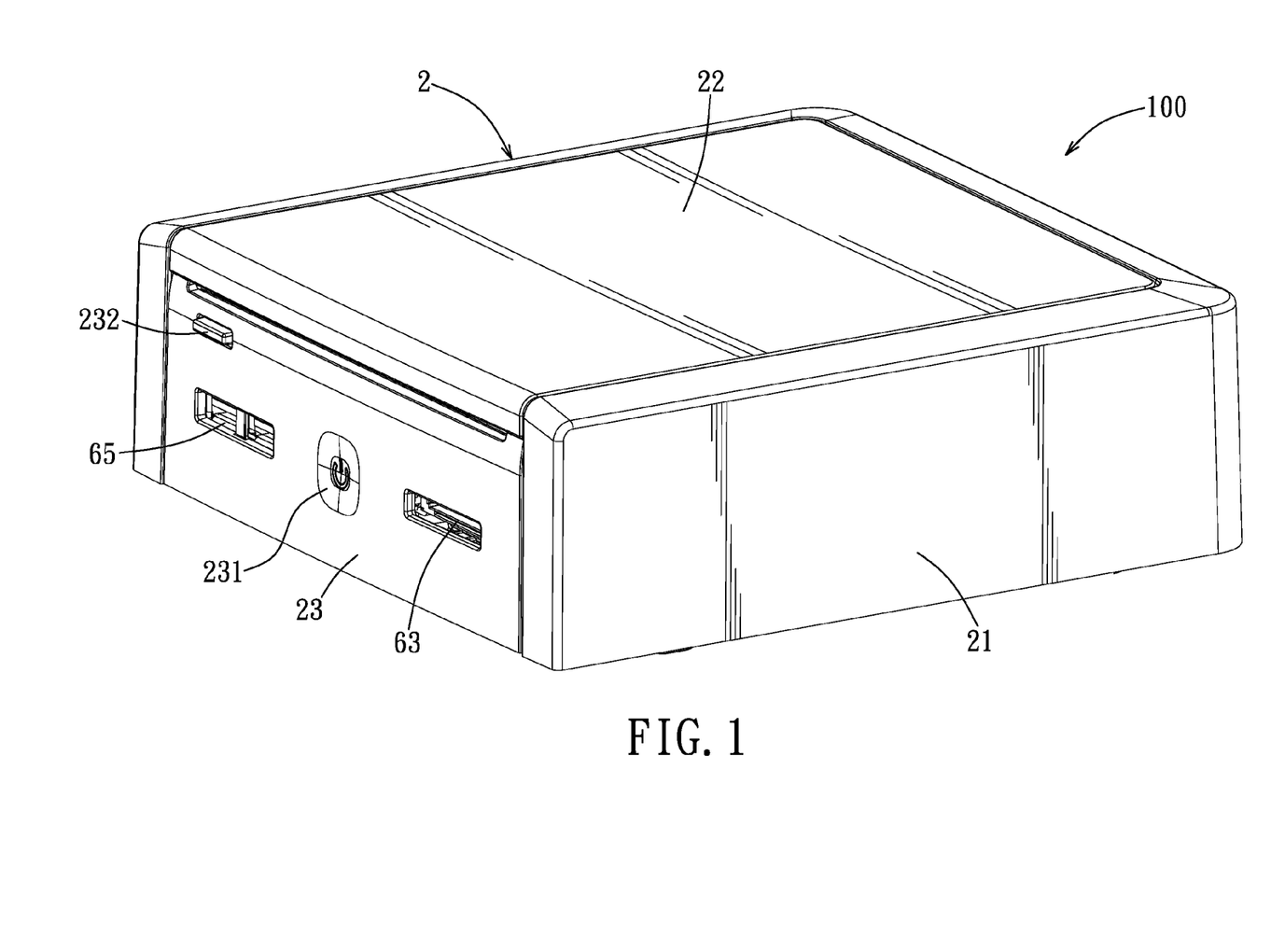
FIG. 1 is a perspective view of a computer according to the embodiment of this invention.
Figure 2:
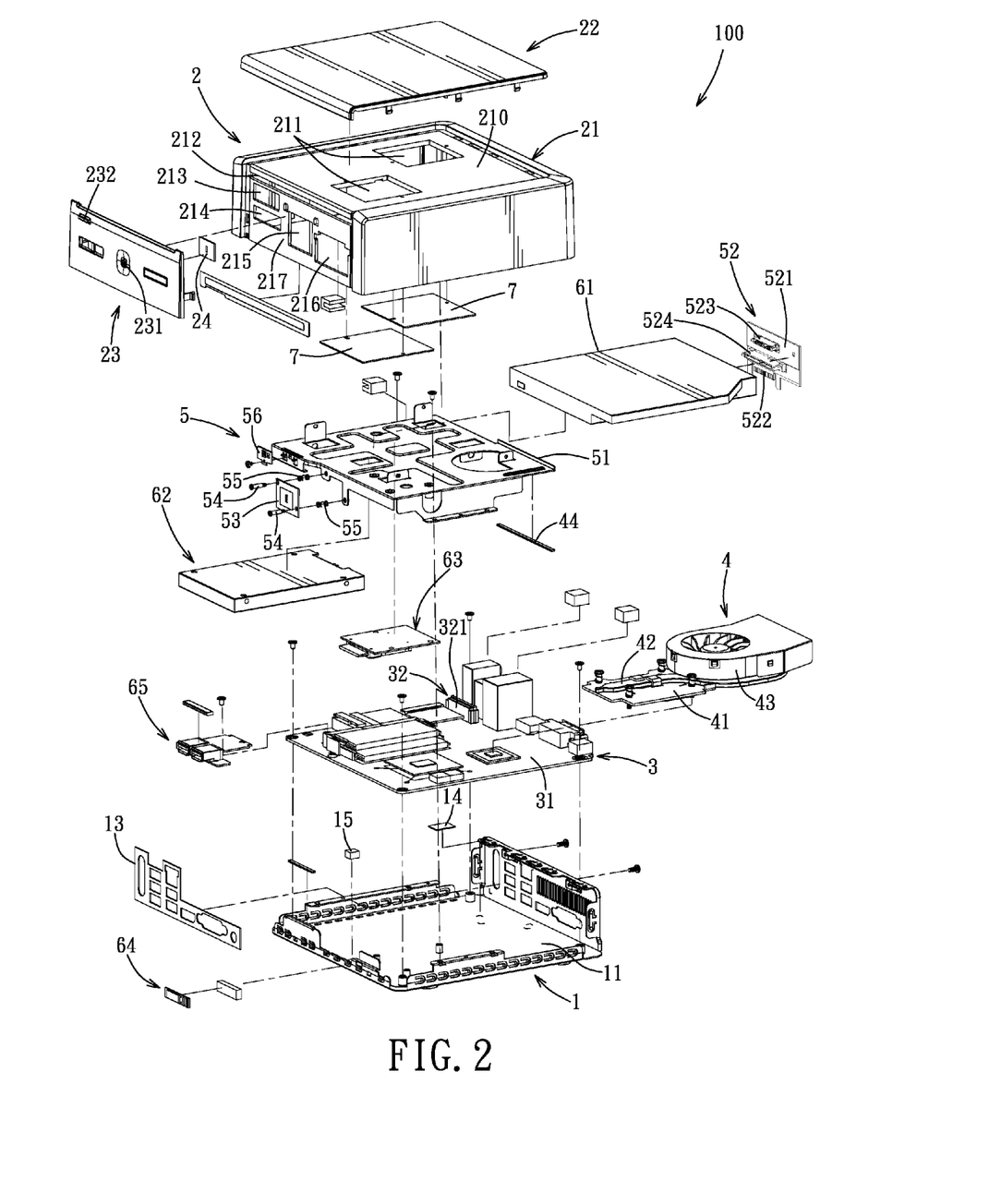
FIG. 2 is an exploded perspective view of the embodiment.

The cover unit 2 includes a frame 21 having an upper wall 210 formed with two spaced-apart antenna holes 211, and a front wall 217 formed with different sizes of through holes 212~216 corresponding respectively to locations of an optical disk drive 61, an ejector control key 56, a USB connector 65, a power switch, and a card reader 63. The frame 21 further has a top plate 22 and a front plate 23 respectively covering a top side and a front side thereof. That is, the top plate 22 is disposed above the upper wall 210 to cover the antenna holes 211, and the front plate 23 is disposed in front of the front wall 217 to cover the through holes 212~216. The front plate 23 has a press button 231 and a disk ejector operator 232 provided on a front side thereof. The function of the press button 231 and the disk ejector operator 232 will be described later. The cover unit 2 further includes a buffer pad 24 made of silicone adhered fixedly to a rear side of the press button 231.

The computer 100 further includes two flat plate antennas 7 disposed on a bottom surface of the upper wall 210 corresponding in position to the antenna holes 211. It should be noted that the flat plate antenna 7 correspond in number to the antenna hole 211. The top plate 22 covers the upper wall 210 to maintain an aesthetic appearance of the computer 100.

Figure 3:
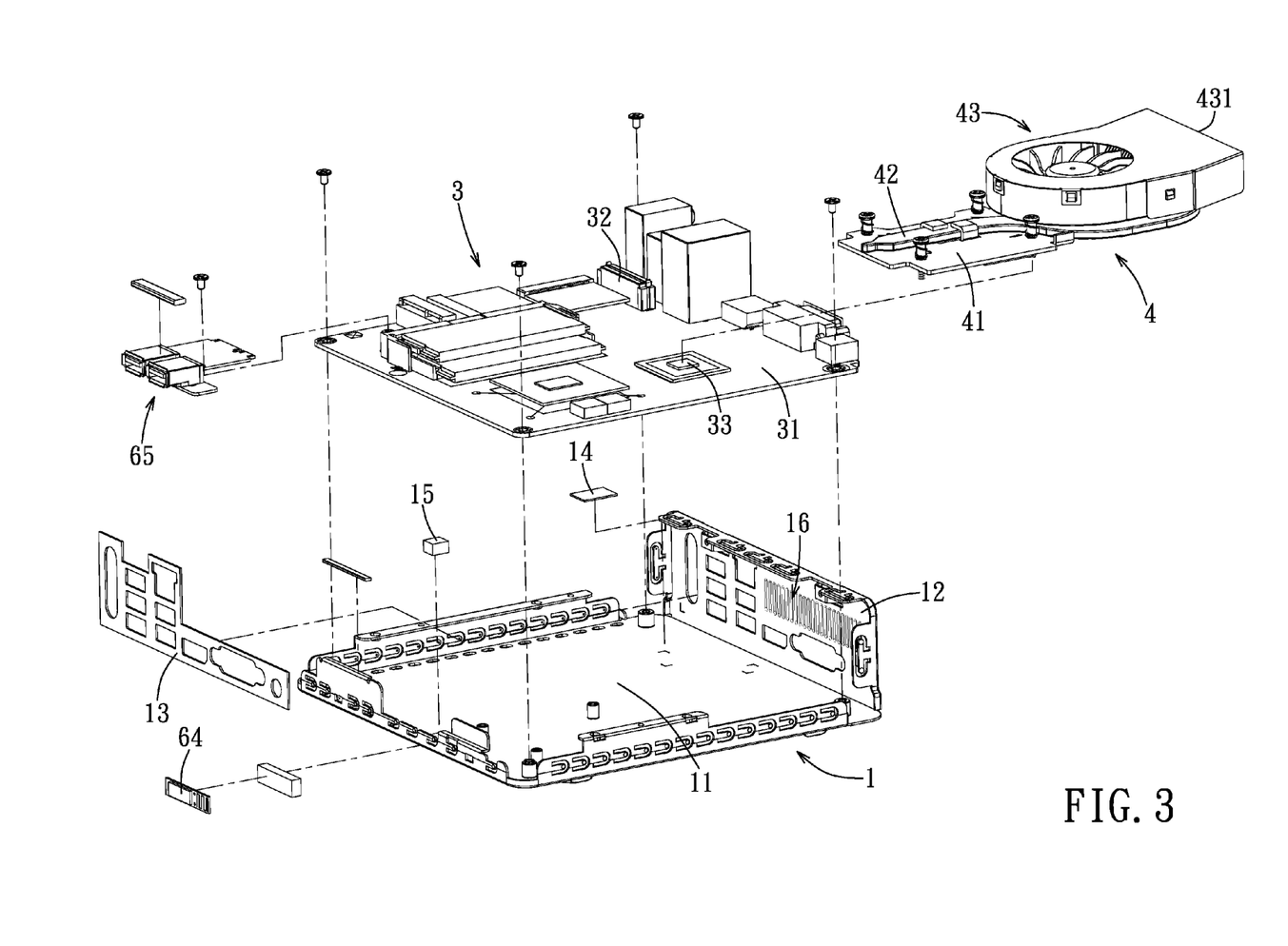
FIG. 3 is an exploded perspective view of a base, a motherboard unit, and a heat dissipation module of the embodiment.

The base 1 includes a bottom plate 11, a rear plate 12 extending upwardly from a rear edge of the bottom plate 11 and formed with a plurality of vent holes 16, a conductive gasket 13 adhered to a front surface of the rear plate 12, and a silicone piece 14 and a rubber piece 15 adhered to a top surface of the bottom plate 11 for buffering purposes. The conductive gasket 13 is grounded to prevent electromagnetic interferences.

The motherboard unit 3 includes a motherboard 31 screwed to the base 1.

The heat dissipation module 4 includes a substrate 41, a heat pipe 42 mounted on the substrate 41, a fan 43 connected to a rear end of the substrate 41, and a buffer strip 44 mounted on a top surface of the fan 43 in proximity to a rear edge thereof.

Figure 4:
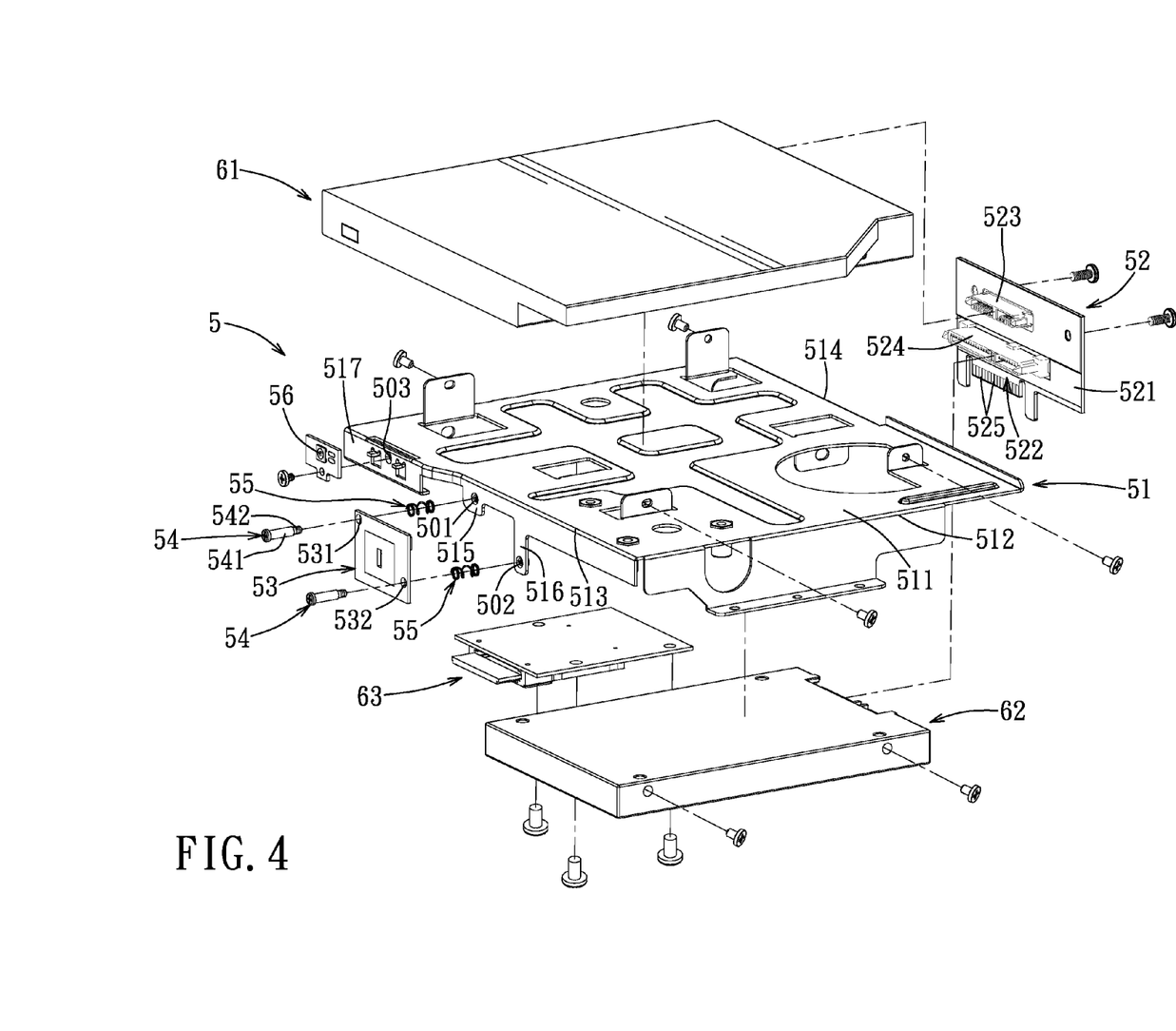
FIG. 4 is an exploded perspective view of a frame module of the embodiment.
Figure 5:
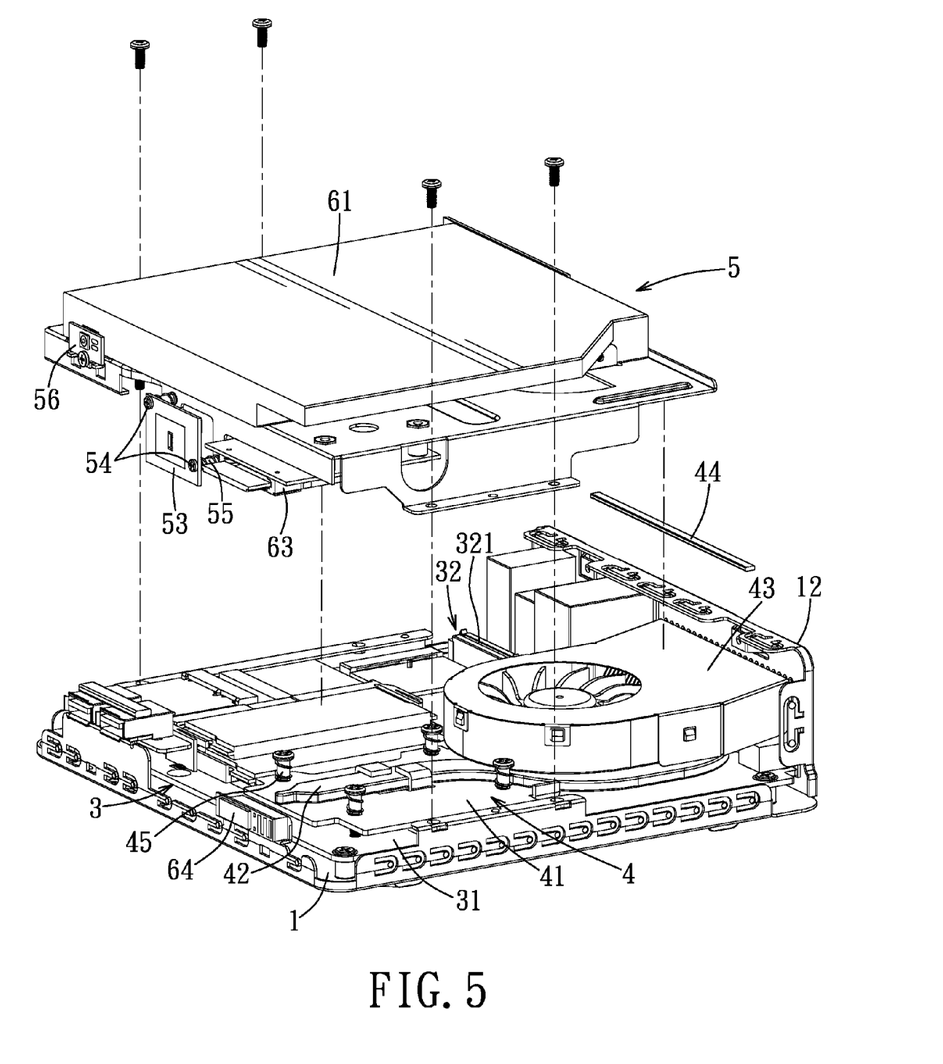
FIG. 5 is an exploded perspective view of the frame module and an assembly of the components of FIG. 3.
Figure 6:
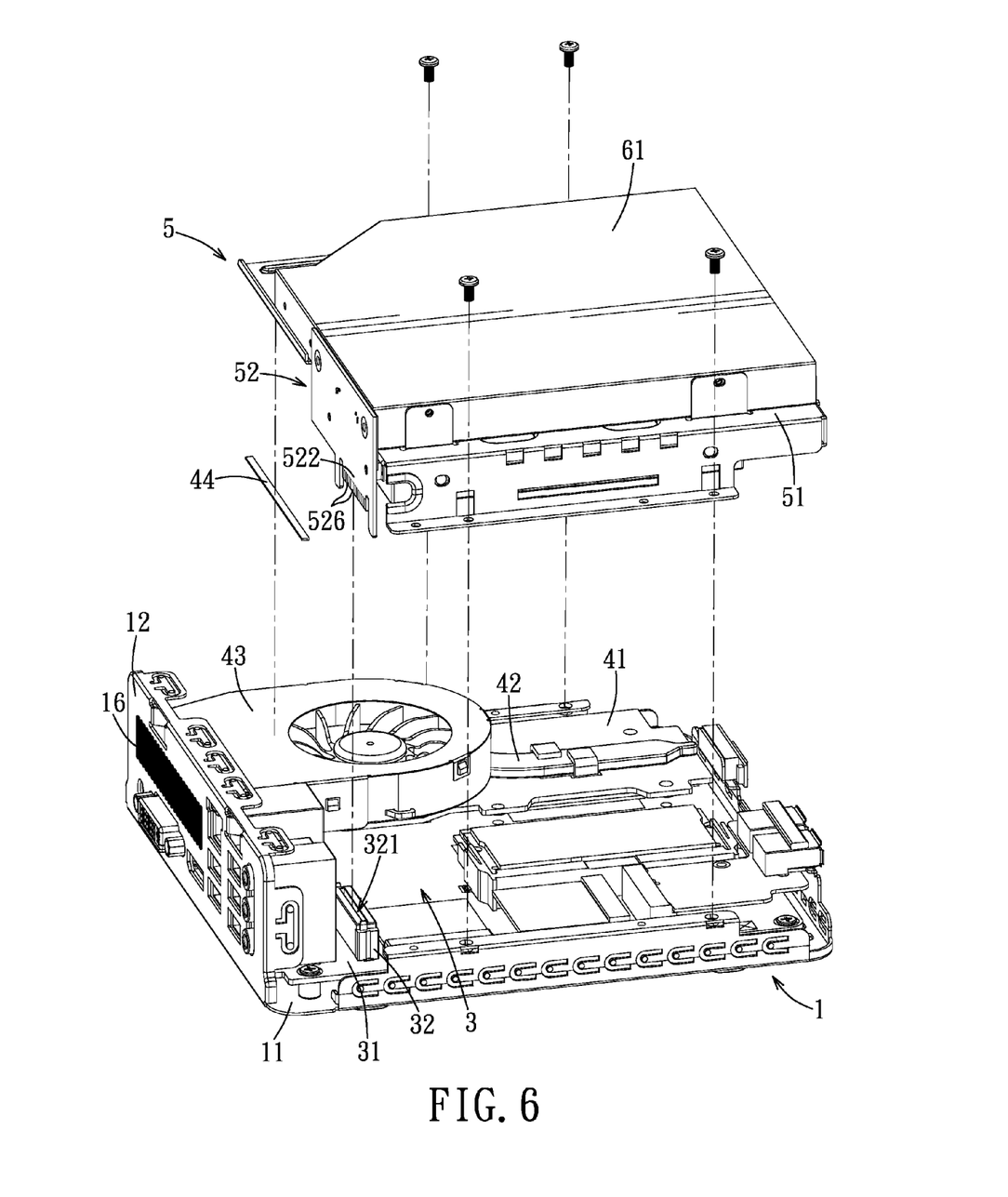
FIG. 6 is a view similar to FIG. 5, but taken from another angle.
Figure 7:
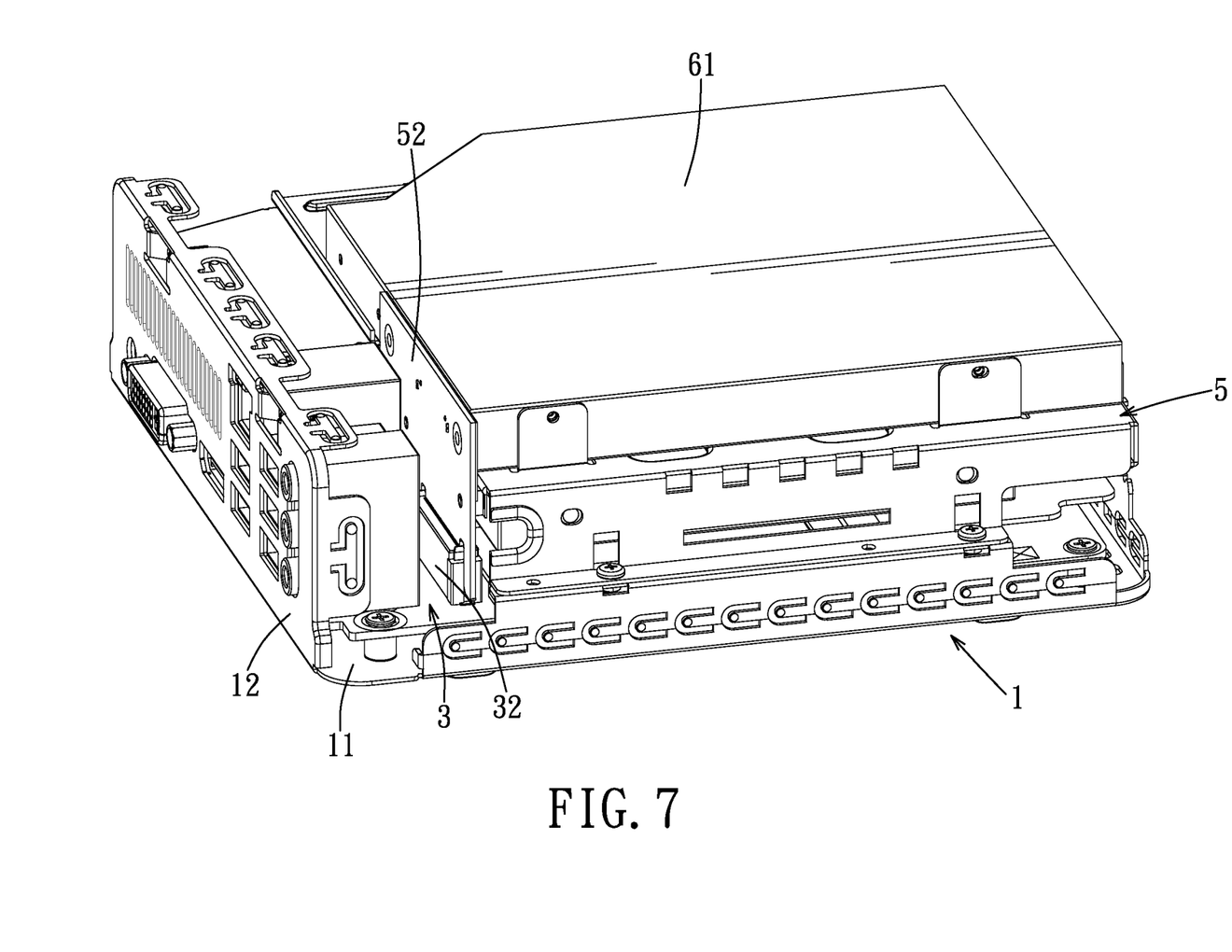
FIG. 7 is an assembled perspective view of the embodiment corresponding to FIG. 6.
Figure 8:
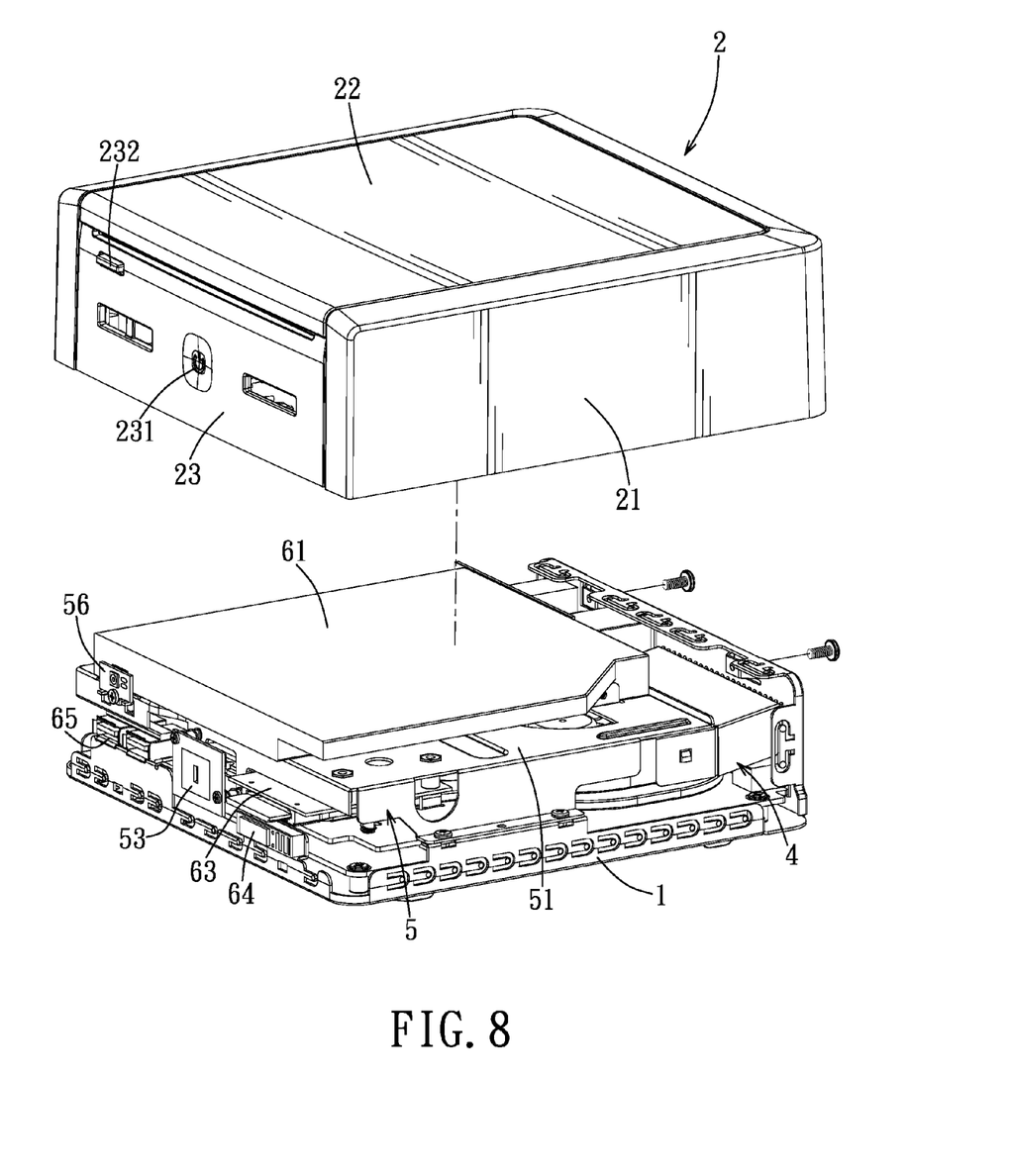
FIG. 8 is an assembled perspective view of the embodiment prior to installation of a cover body.

The substrate 41 is fixed to the base 1 through the use of a plurality of spring-loaded step screws 45 that extend through the motherboard 31 and that engage threadedly the bottom plate 11. The substrate 41 is in contact with a heat-generating element 33 of the motherboard unit 3, for example, a CPU, etc. Heat generated by the heat-generating element 33 is transmitted to the heat pipe 42 and is dissipated through the fan 43. The fan 43 has a rear end abutting against the rear plate 12 and provided with an air outlet 431 corresponding in position to the vent holes 16, and an air inlet (not shown) disposed in proximity to the center of the housing 2. The Bluetooth transmitter 64 and the USB connector 65 are respectively mounted on specific locations of the base 1 and the motherboard 31. With reference to FIG. 4, the frame module 5 includes a frame body 51, an adaptor board 52, a sensor board 53, two step screws 54, two springs 55, and an ejector control key 56.

The frame body 51 has a plate shape, and includes a top surface 511, a bottom surface 512, a front end 513, and a rear edge 514. The optical disk drive 61 is connected to the top surface 511. The hard disk drive 62 and the card reader 63 are connected to the bottom surface 512.

The adaptor board 52 includes a board body 521 connected transversely to the rear edge 514 and having an edge connector 522 extending downwardly therefrom, and a first electrical connector 523 and a second electrical connector 524 formed on a front side of the board body 521 and spaced apart from each other in a top-bottom direction. The first electrical connector 523 is proximate to the top surface 511 of the frame body 51 and is connected electrically to the optical disk drive 61. The second electrical connector 524 is proximate to a bottom surface 512 of the frame body 51 and is connected electrically to the hard disk drive 62.

With reference to FIGS. 4 to 7, the edge connector 522 includes a plurality of spaced-apart first contacts 525 arranged on a front surface thereof, and a plurality of spaced-apart second contacts 526 arranged on a rear surface thereof. The motherboard unit 3 further includes a socket connector 32 provided on a top surface of the motherboard 31 and formed with an insert groove 321. The insert groove 321 has a front groove wall provided with a plurality of spaced-apart first contacts (not shown), and a rear groove wall provided with a plurality of spaced-apart second contacts (not shown). The first and second contacts 525, 526 of the edge connector 522 are respectively in electrical contact with the first and second contacts of the socket connector 32 when the edge connector 522 is inserted into the insert groove 321.

Through the configurations of the frame body 51 and the adaptor board 52, the optical disk drive 61 and the hard disk drive 62 can be stacked one above the other, and signals generated therefrom can be transmitted to the motherboard 31 through the adaptor board 52. Hence, utilization of space can be efficiently achieved. Further, because the front and rear surfaces of the edge connector 522 respectively have first and second contacts 525, 526, and the front and rear groove walls of the insert groove 321 respectively have first and second contacts corresponding to the first and second contacts 525, 526, electrical connection between the adaptor board 52 and the socket connector 32 can be ensured even in the presence of assembly tolerances.

Referring again to FIGS. 2, 4 and 5, when a user presses the flexible press button 231 for a specific number of seconds, the sensor board 53 detects and generates a signal which is then transmitted to the motherboard 31 to execute power ON/OFF operation of the computer 100. In this embodiment, the frame module 5 is also designed to ensure the touch effect.

The frame body 51 further includes spaced-apart first and second mounting lugs 515, 516 extending downwardly and transversely from the front edge 513, and a first mounting hole 501 and a second mounting hole 502 respectively formed in the first and second mounting lugs 515, 516. The first mounting lug 515 is shorter than the second mounting lug 516. The first and second mounting holes 501, 502 are disposed at different levels.

The sensor board 53 is disposed in front of the first and second mounting lugs 515, 516, and corresponds in position to the through hole 215 in the front wall 217 of the frame 21 and the press button 231 of the front plate 23. The sensor board 53 is formed with two orifices 531, 532 that are registered respectively with the first and second mounting holes 501, 502 and that have an orifice diameter ($d_1$) larger than a hole diameter of the first and second mounting holes 501, 502. The buffer pad 24 is sandwiched between the press button 231 and the sensor board 53.

The step screws 54 are provided to connect the sensor board 53 to the front edge 513 of the frame body 51. Each of the step screws 54 has a first section 541 and a second section 542 coaxially connected to each other. The first section 541 has a cross section diameter ($d_2$) larger than that of the second section 542. The first sections 541 of the step screws 54 extend respectively through the orifices 531, 532. The second sections 542 of the step screws 54 extend respectively into and are fixed threadedly and respectively in the first and second mounting holes 501, 502.

The springs 55 are sleeved respectively on the first sections 541 of the step screws 54. Each of the springs 55 has a free length longer than that of the first section 541, a front end abutting against a rear side of the sensor board 53, and a rear end abutting against a front side of a corresponding one of the first and second mounting lugs 515, 516 to provide the sensor board 53 with a biasing force. That is, the springs 55 bias the sensor board 53 to move toward the buffer pad 24 and the press button 231. In this embodiment, the ratio between the orifice diameter ($d_1$) and the cross section diameter ($d_2$) ranges from 1.05 to 1.11, more preferable is 1.08.

Figure 9:
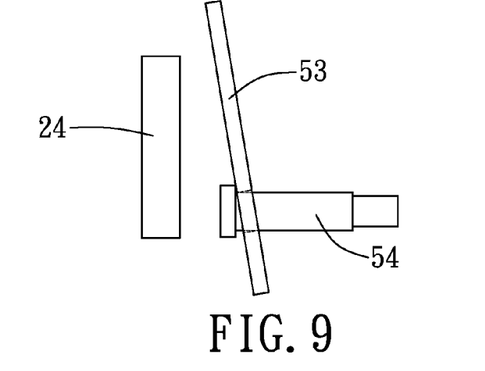
FIGS. 9 to 11 illustrate consecutive steps involved in correcting a position of a sensor board.
Figure 10:
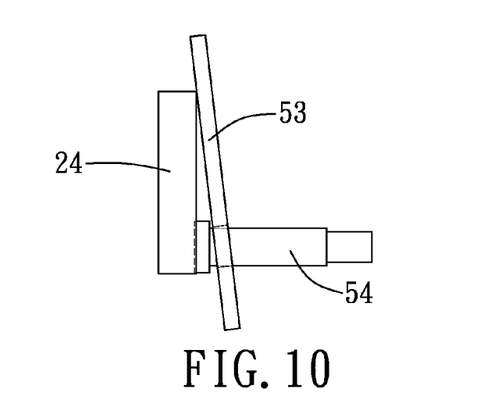
Figure 11:
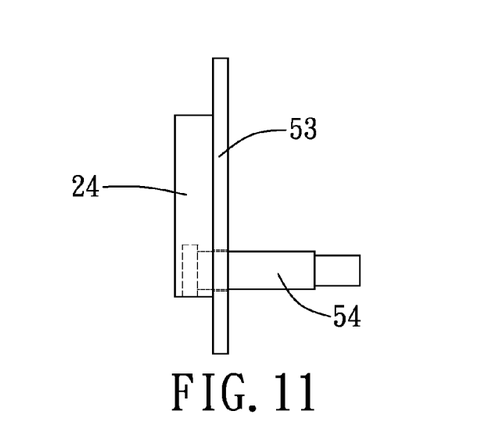

Below is a description of the advantages of the frame module 5 with reference to FIGS. 4, 5, 8, and 9 to 11. The sensor board 53 is connected to the motherboard 31 through a cable (not shown). Because the two assembly points of the sensor board 53 are not symmetrical, during assembly, the sensor board 53 is pulled by the cable to move to a slanting position, as shown in FIG. 9. The ratio between the orifice diameter ($d_1$) and the cross section diameter ($d_2$) allows the sensor board 53 to be slanted to a certain degree and ensures that the position of the sensor board 53 can be corrected. The sensor board 53 is in the slanting position until the cover unit 2 covers the base 1 (see FIG. 1). At this time, the buffer pad 24, as shown in FIG. 10, abuts partially against the sensor board 53. When the cover unit 2 is completely positioned to the base 1, the buffer pad 24 pushes the sensor board 53 and completely abuts against the same, as shown in FIG. 11, such that the sensor board 53 and the buffer pad 24 are in tight contact with each other without any gap after assembly of the cover unit 2 and the base 1.

Figure 12:
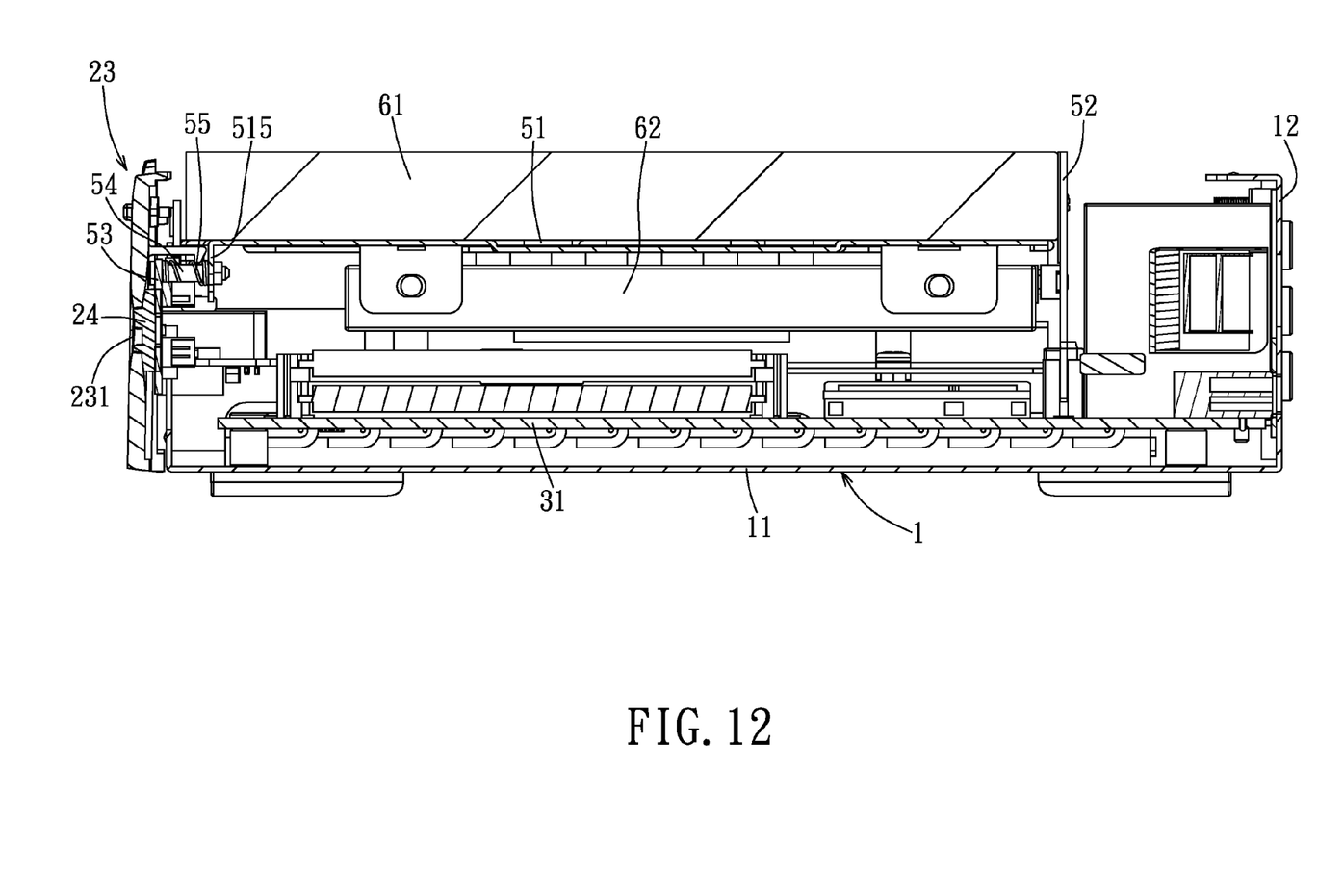
FIG. 12 is a sectional side view of the embodiment.
Figure 13:
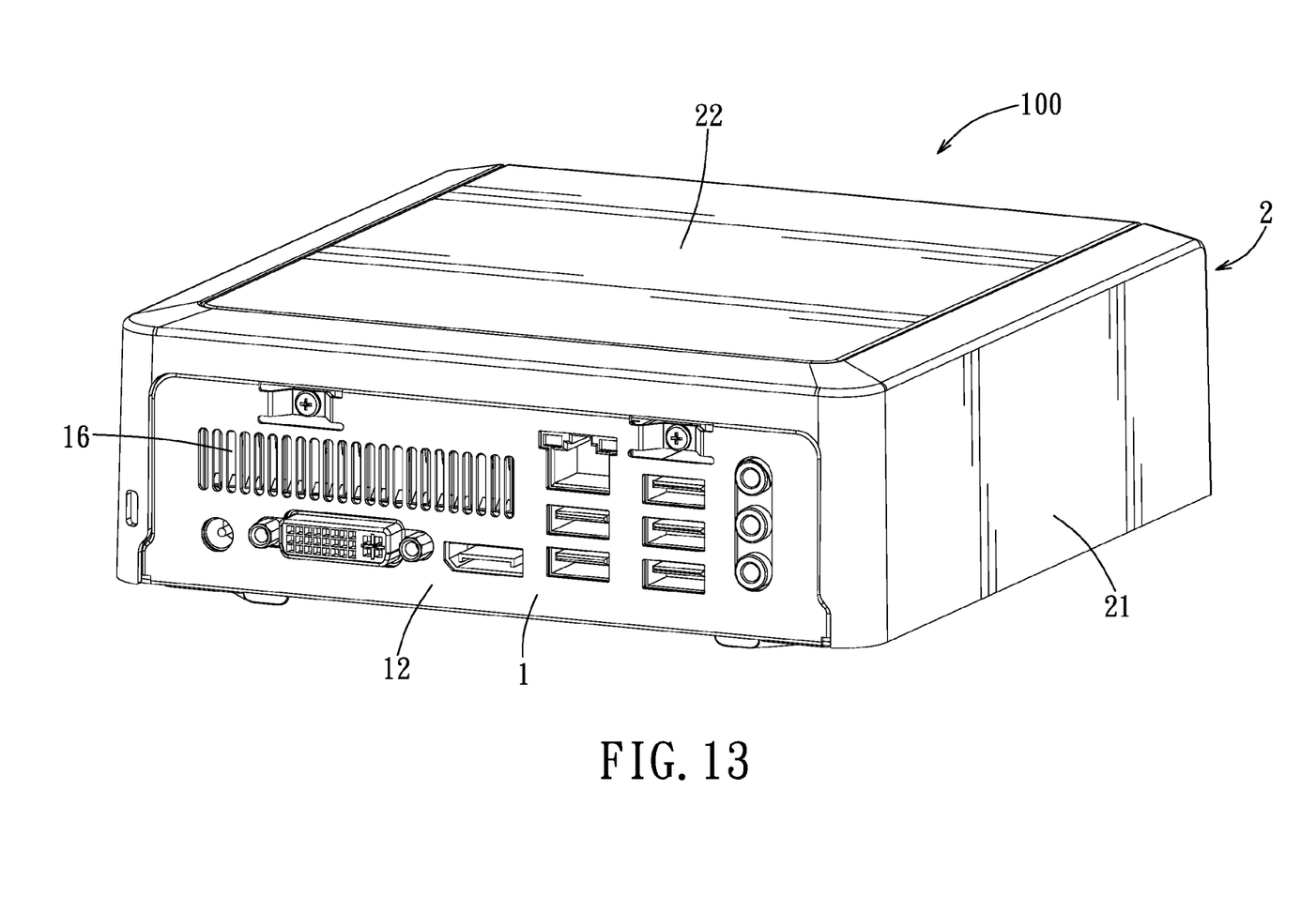
FIG. 13 is a perspective view of the computer of the embodiment taken from another angle.

FIG. 12 illustrates a sectional side view of the computer 100 of the embodiment. In this embodiment, the springs 55 with an appropriate coefficient of elasticity are employed so that perfect contact and abutment among the press button 231, the buffer pad 24, and the sensor board 53 can be achieved.

Since in different computers 100, the specification of the optical disk drive 61 is not necessarily the same, the ejector control key 56 of some computers may be located at the left side, while others at the right side. Hence, the frame module 5 of this embodiment is designed to correspond to this portion. A detailed description thereof is given hereinafter.

With reference to FIG. 4, the frame body 51 of the frame module 5 further includes a mounting flange 517 extending downwardly and transversely from the front edge 513 and spaced apart from the first and second mounting lugs 515, 516, and a third mounting hole 503 formed in the mounting flange 517. The ejector control key 56 is formed as a plate that abuts against the mounting flange 517 and that is fastened to the third mounting hole 503 so that the ejector control key 56 is disposed at the front edge 513 of the frame body 51. The ejector control key 56 is coupled electrically to the optical disk drive 61. When the frame module 5 is disposed in the housing, the ejector control key 56 abuts against a rear side of the disk ejector operator 232 of the front plate 23. When the disk ejector operator 232 is pressed, it can contact and push the ejector control key 56, so that the optical disk drive 61 can execute an ejection operation.

Through such a configuration, whatever is the specification of the optical disk drive 61, all wiring is connected to the ejector control key 56, and there is no need to open a new mold for the cover unit 2.

Referring once again to FIGS. 2, 6 and 7, the assembly of the frame module 5 to the base 1 is accomplished by adhering first the buffer strip 44 to the top surface of the fan 43, after which the edge connector 522 of the adaptor board 52 is inserted into the insert groove 321 of the socket connector 32. The function of the buffer strip 44 is not only to permit the suspended rear end (where the fan 43 is located) of the heat dissipation module 4 be pressed to enhance its stability, but also to block internal air from flowing out of the top side of the fan 43 to prevent turbulence. Hence, the internal air flow can be smoothly concentrated to enhance the heat dissipation efficiency. Finally, with reference to FIG. 13, after the front end of the housing 2 is aligned with the base 1, the rear end is pressed downward, and then the screws are used to fasten together the housing 2 and the base 1, thereby completing the assembly of the computer 100.

In summary, through the excellent internal space planning of the computer 100 of the present invention, in response to customization requirement, all aspects of the hardware devices can be put together inside the housing of the computer 100. Further, with a special structural design of the power switch, a touch effect and yield can be ensured. Moreover, different specifications of the optical disk drive 61 can be accommodated. As a whole, this invention has an excellent structural design for a mini computer. Therefore, the object of this invention can be achieved.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A frame module adapted to be disposed in a housing of a computer for fixing a first electronic device and a second electronic device, the computer including a motherboard unit with a socket connector, said frame module comprising:

a frame body including a top surface adapted to be connected to the first electronic device, a bottom surface adapted to be connected to the second electronic device, a front edge, spaced-apart first and second mounting lugs extending downwardly and transversely from said front edge, and a first mounting hole and a second mounting hole respectively formed in said first and second mounting lugs, said first and second mounting holes being disposed at different levels;

an adaptor board including a board body connected transversely to a rear edge of said frame body and having an edge connector extending downwardly therefrom and adapted to be inserted into the socket connector of the motherboard unit, and a first electrical connector and a second electrical connector provided on a front side of said board body and spaced apart from each other in a top-bottom direction, said first electrical connector being disposed in proximity to said top surface of said frame body for electrical connection with the first electronic device, said second electrical connector being disposed in proximity to said bottom surface of said frame body for electrical connection with the second electronic device;

a sensor board disposed in front of said first and second mounting lugs and formed with two orifices that are registered respectively with said first and second mounting holes and that have an orifice diameter larger than a hole diameter of said first and second mounting holes;

two step screws each having a first section and a second section coaxially connected to each other, said first section having a cross section diameter larger than that of said second section, said first sections of said step screws respectively extending through said orifices of said sensor board, said second sections of said step screws respectively extending respectively into and being fixed threadedly and respectively in said first and second mounting holes; and two springs sleeved respectively on said first sections of said step screws, each of said springs having a free length longer than that of said first section, a front end abutting against a rear side of said sensor board, and a rear end abutting against a front side of a corresponding one of said first and second mounting lugs to provide said sensor board with a biasing force.

2. The frame module as claimed in claim 1, wherein the ratio between the orifice diameter of said orifices and the cross section diameter of said first section ranges from 1.05 to 1.11.

3. The frame module as claimed in claim 1, the first electronic device is an optical disk drive, and the housing includes a disk ejector operator provided on a front side thereof, wherein said frame module further comprises an ejector control key disposed on said front edge of said frame body for coupling electrically the optical disk drive and for abutment against a rear side of the disk ejector operator.

4. The frame module as claimed in claim 3, wherein said frame body further includes a mounting flange extending downwardly and transversely from said front edge of said frame body and spaced apart from said first and second mounting lugs, and a third mounting hole formed in said mounting flange, said ejector control key being formed as a plate that is fastened to said third mounting hole and that abuts against said mounting flange.

5. A computer comprising:
a housing including a front plate having a press button;
a motherboard unit disposed in said housing and including a socket connector;
a first electronic device and a second electronic device; and
a frame module including
a frame body including a top surface connected to said first electronic device, a bottom surface connected to said second electronic device, a front edge, spaced-apart first and second mounting lugs extending downwardly and transversely from said front edge of said frame body, and a first mounting hole and a second mounting hole respectively formed in said first and second mounting lugs, said first mounting hole and said second mounting hole being disposed at different levels; and
an adaptor board including a board body connected transversely to a rear edge of said frame body and having an edge connector extending downwardly therefrom and inserted into said socket connector, and a first electrical connector and a second electrical connector provided on a front side of said board body and spaced apart from each other in a top-bottom direction, said first electrical connector being disposed in proximity to said top surface of said frame body and connected electrically to said first electronic device, said second electrical connector being disposed in proximity to said bottom surface of said frame body and connected electrically to said second electronic device;
a sensor board disposed in front of said first and second mounting lugs and formed with two orifices that are registered respectively with said first and second mounting holes and that have an orifice diameter larger than a hole diameter of said first and second mounting holes;
two step screws each having a first section and a second section coaxially connected to each other, said first section having a cross section diameter larger than that of said second section, said first sections of said step screws extending respectively through said orifices of said sensor board, said second sections of said step screws extending respectively into and being fixed threadedly and respectively in said first and second mounting holes; and
two springs sleeved respectively on said first sections of said step screws, each of said springs having a free length longer than that of said first section, a front end abutting against a rear side of said sensor board, and a rear end abutting against a front side of a corresponding one of said first and second mounting lugs to provide said sensor board with a biasing force.

6. The computer as claimed in claim 5, wherein the ratio between the orifice diameter of said orifices and the cross section diameter of said first section ranges from 1.05 to 1.11.

7. The computer as claimed in claim 5, wherein said housing further includes a buffer pad sandwiched between said press button and said sensor board.

8. The computer as claimed in claim 5, wherein said first electronic device is an optical disk drive, said housing including a disk ejector operator provided on a front side thereof, said frame module further comprising an ejector control key disposed on said front edge of said frame body and coupling electrically said optical disk drive and abutting against a rear side of said disk ejector operator.

9. The computer as claimed in claim 8, wherein said frame body further includes a mounting flange extending downwardly and transversely from said front edge of said frame body and spaced apart from said first and second mounting lugs, and a third mounting hole formed in said mounting flange, said ejector control key being formed as a plate that is fastened to said third mounting hole and that abuts against said mounting flange.

10. The computer as claimed in claim 5, wherein said housing includes a rear plate formed with a vent hole, said computer further comprising:
a base to mount said motherboard unit thereon; and
a heat dissipation module including a substrate, a heat pipe mounted on said substrate, a fan connected to a rear end of said substrate, and a buffer strip mounted on a top surface of said fan in proximity to a rear edge of said fan;
said motherboard unit having a heat-generating element, said substrate being in contact with said heat-generating element and being fixed to said base, said fan being formed with an air inlet, and an air outlet corresponding to said vent hole.

11. The computer as claimed in claim 5, wherein said housing includes a cover unit having a top plate covering a top side of said cover unit, said cover unit being formed with at least one antenna hole, said computer further comprising an antenna corresponding in number to said antenna hole and disposed on said cover unit corresponding in position to said antenna hole.

* * * * *